United States Patent [19]
Zajfman et al.

[11] Patent Number: 6,072,523
[45] Date of Patent: Jun. 6, 2000

[54] SYSTEM AND A METHOD OF THREE-DIMENSIONAL IMAGING

[75] Inventors: Daniel Zajfman; Oded Herber; Zeev Vager, all of Rehovot, Israel

[73] Assignee: Yeda Research and Development Co. Ltd., Rehovot, Israel

[21] Appl. No.: 09/043,582

[22] PCT Filed: Sep. 25, 1996

[86] PCT No.: PCT/IL96/00117

§ 371 Date: Mar. 26, 1998

§ 102(e) Date: Mar. 26, 1998

[87] PCT Pub. No.: WO97/12326

PCT Pub. Date: Apr. 3, 1997

[30] Foreign Application Priority Data

Sep. 27, 1995 [IL] Israel ........................................ 115428

[51] Int. Cl.[7] .................................................. H04N 13/00
[52] U.S. Cl. ........................... 348/42; 250/213; 250/367; 250/368; 369/106; 369/121; 128/664; 128/665
[58] Field of Search .............................. 348/42, 139, 119, 348/114–116, 142, 121; 382/106, 153, 154; 250/341, 214

[56] References Cited

U.S. PATENT DOCUMENTS

| | | | |
|---|---|---|---|
| 3,594,583 | 7/1971 | Sheldon | 250/213 |
| 4,076,984 | 2/1978 | Gromov et al. | 250/367 |
| 5,204,522 | 4/1993 | Takahashi et al. | 250/214 |
| 5,276,757 | 1/1994 | Levy et al. | 385/109 |
| 5,371,368 | 12/1994 | Alfano et al. | 250/341 |
| 5,684,531 | 11/1997 | Li et al. | 348/139 |

*Primary Examiner*—Andy Rao
*Assistant Examiner*—Shawn An
*Attorney, Agent, or Firm*—Greenblum & Bernstein, P.L.C.

[57] ABSTRACT

There is provided a three-dimensional imaging system (2), including a first camera (6) and a second camera (8), both facing a field of view of two-dimensional images and a normally open, fast gating device (12) interposed between the second camera (8) and the field of view (14 and 26). The system further includes a frame grabber (10) connected to the first and the second camera, and a computer (14) for receiving signals representing, pixel by pixel, light intensities of an image during a predetermined period of time and signals representing same pixel by pixel of light intensities arriving at the second camera until the fast gating device (12) is closed, and for determining three-dimensional imaging signals therefrom to eventually be displayed. A method for producing three-dimensional imaging is also provided.

10 Claims, 2 Drawing Sheets

SYSTEM AND A METHOD OF THREE-DIMENSIONAL IMAGING

TECHNICAL FIELD

The present invention relates to the art of imaging and more particularly to a system and method of three-dimensional imaging.

BACKGROUND ART

Three-dimensional imaging is a widely used technique for any applications in everyday life. The systems and methods that are used so far, however, either request many input samples and computer reconstruction of the image such as in Computerized Tomography or in Nuclear Magnetic Resonance, or many independent probes together with sophisticated and expensive electronics such as in particle-radiation detectors.

Artificial vision is very important in robotics and automatic control. The problematic issue in the known techniques is that the pictures which are seen by the robot are only two-dimensional, making the handling of volume object and position determination difficult. Hence, most of the research and development on artificial vision is focused on how to reconstruct the 3-D picture by pattern recognition and similar methods which are problematic and slow.

DISCLOSURE OF THE INVENTION

It is therefore a broad object of the present invention to overcome the above, and other disadvantages of the known three-dimensional imaging devices and to provide a simple and fast three-dimensional imaging system based on known technology.

According to the present invention there is provided a three-dimensional imaging system, comprising a first camera and a second camera, both facing a field of view of two-dimensional images and a normally open, fast gating device interposed between said second camera and said field of view, a frame grabber connected to said first and said second camera, and a computer for receiving signals representing, pixel by pixel, light intensities of an image during a predetermined period of time and signals representing same pixel by pixel of light intensities arriving at said second camera until said fast gating device is closed, and for determining three-dimensional imaging signals therefrom to eventually be displayed.

The invention further provides a method for producing three-dimensional imaging, comprising receiving, by a first camera, signals representing, pixel by pixel, light intensities of two-dimensional images displayed on an electroluminescent screen of a known decay time, receiving said signals representing, pixel by pixel, light intensities of two-dimensional images displayed on said screen by a second camera facing said screen through a fast gating device, closing said gating device and noting the gating time, and determining, pixel by pixel, signals representing a three-dimensional image by dividing signals representing light intensities of said first camera, by signals representing light intensities of said second camera until the closing of said gating device, in consideration of said decay time and gating time.

The invention also provides a method for producing three-dimensional imaging, comprising receiving, by a first camera, signals representing, pixel by pixel, light intensities of two-dimensional images constituted by an incoming or reflected radiation emanating from a pulsed light source of a known time dependency, receiving through a fast gating device by a second camera, said signals representing, pixel by pixel, light intensities of two-dimensional images constituted by an incoming or reflecting radiation emanating from a pulsed light source of a known time dependency, closing said gating device and noting the gating time, and determining, pixel by pixel, signals representing a three-dimensional image by dividing signals representing light intensities of said first camera, by signals representing light intensities of said second camera until the closing of said gating device, in consideration of said time dependency and gating time.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
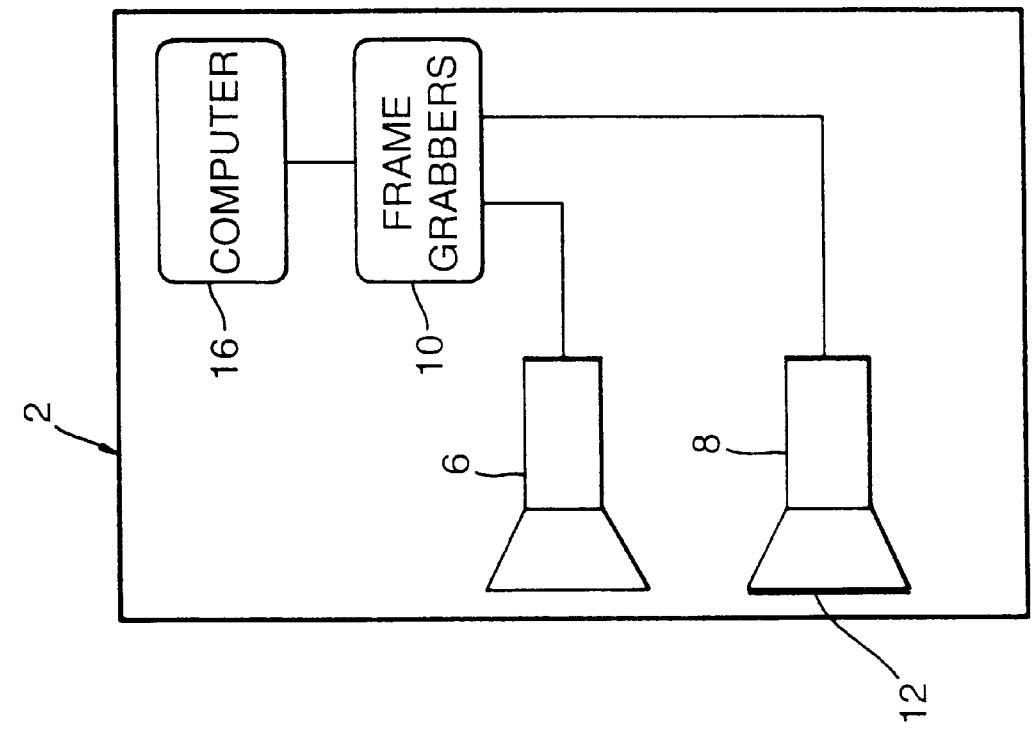
FIG. 1 is a schematic representation of the system for three-dimensional imaging according to the present invention.
Figure 1:
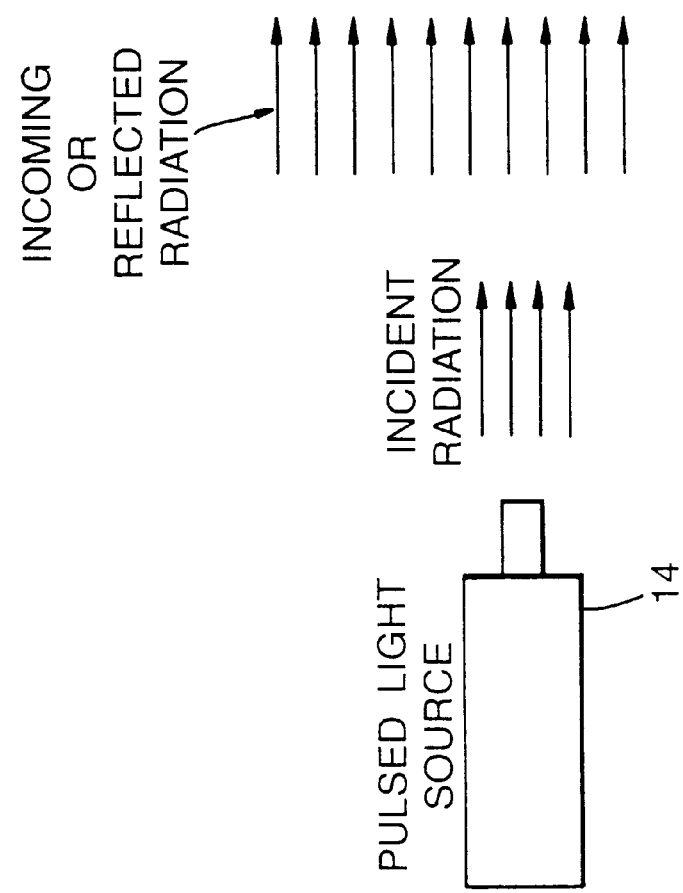

There is illustrated in FIG. 1 a three-dimensional imaging system 2 according to the present invention. The system 2 includes a first camera, e.g., a CCD camera 6 and a second camera 8, both cameras facing the same direction and being connected to a frame grabber 10. Instead of a frame grabber circuit, a frame threshold suppressor circuit can be used, however, as the functions of grabber and suppressor are the same, the term "frame grabber" will be used herein to designate both types of circuits.

Camera 8 is associated with a fast gating device 12 interposed therebetween and the field of view which it faces. The field of view in this embodiment originates at a pulsed light source 14, the time dependency of which is known. The gating device, preferably an optical gate, e.g., a 100 picosecond gating device, is normally open, and closes upon command. A computer (processor) 16, the functions of which will be described hereinafter, is also provided.

Figure 2:
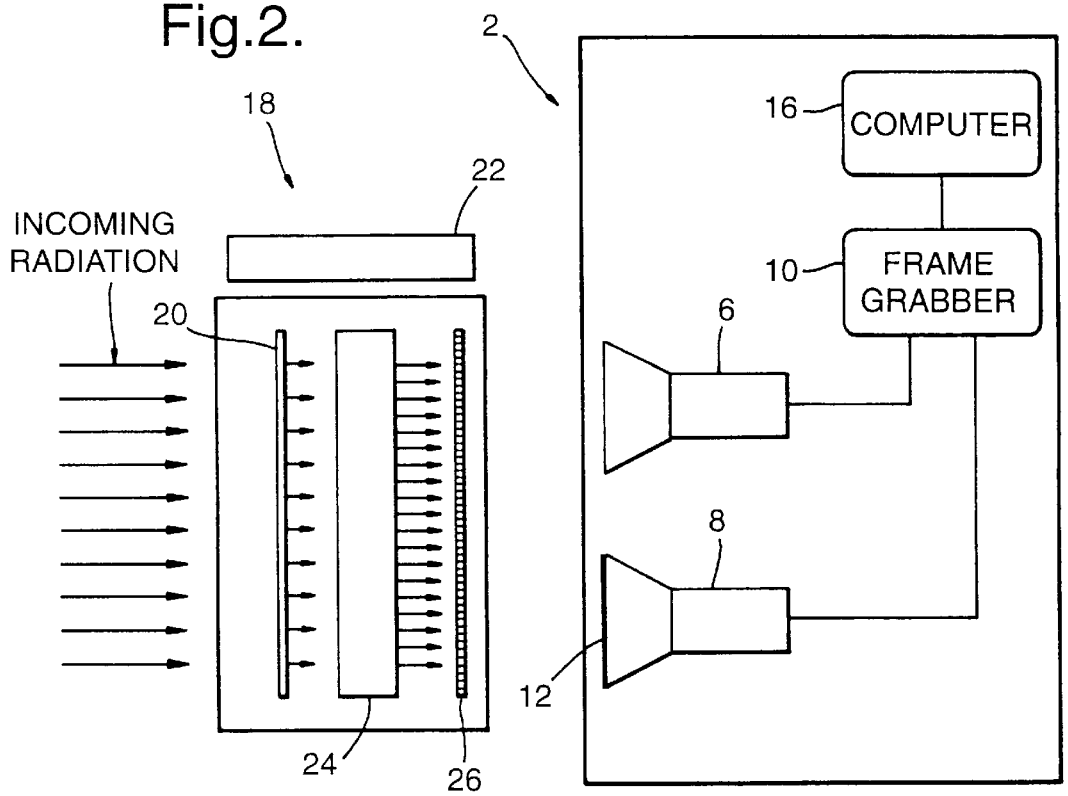
FIG. 2 is a schematic representation of the system for three-dimensional imaging according to the present invention, including a light converting and amplification unit.

Referring to FIG. 2, there is seen the system 2, advantageously utilized with a radiation converting and amplification unit 18. The unit 18 is composed of a first layer 20 constituting a radiation converter for converting the incoming radiation, which may be in the form of visible light, ultra violet, X-ray photons, atoms or fast electrons, to slow electrons. This layer is not needed if the time dependency of the incoming radiation is known. The thusly slowed electrons are then accelerated by an electrostatic field produced by any suitable, per-se known, device 22, to an electron multiplier 24, e.g., a Micro Channel Plate (MCP), which produces up to 10$^7$ electrons for each incoming electron. The amplification is controlled by the potential difference applied to the multiplier. The important characteristics of such MCP's are that these devices are sensitive to single particles and that the amplification process is very fast (nanoseconds) and very localized (50 micrometers). The third layer 26 is a fast (few nanoseconds) decaying electroluminescent screen 26, e.g., a phosphor screen, towards which the electrons are accelerated, creating a light pulse, with a well-defined position and time.

The operation of the imaging system 2, whether or not the incoming, reflected or displayed pulsed radiation is utilized with the radiation converting unit 18, and with reference to FIGS. 1 and 2, is as follows:

A two-dimensional (2-D) image (picture) which constitutes a field of view or is formed on the screen 26, is detected by the two cameras 6 and 8. Camera 6 is used as a regular 2-D imaging device and intensity normalization, while the second camera 8 faces the field of view or screen 26 through the gating device 12. Once the information which is supposed to be recorded is fully displayed on the screen, the gating device closes. Hence, two different pictures of the screen exist: the first one includes the integral intensities of all the light displayed on the screen (i.e., the intensity integrated over the full decay of the phosphor screen) while the second picture contains only the light arrived until the fast gate is closed. Since the phosphor decay time and the gating time are known, or alternatively, if the device 18 is not used and the time dependency of the light intensity is known, by dividing the two picture intensities pixel by pixel, and using a delay calibration curve for the electroluminescent material of the screen, e.g., the phosphor, each point in the picture has a well-defined position and time. The readout of each camera is done using the frame grabber 10. Each picture can be analyzed on line in real time, using the computer 16 at a rate of 50 pictures per second. Position resolution of hundred microns (on the screen) and time resolution of 100 picoseconds can be obtained with the existing technology.

Figure 3:
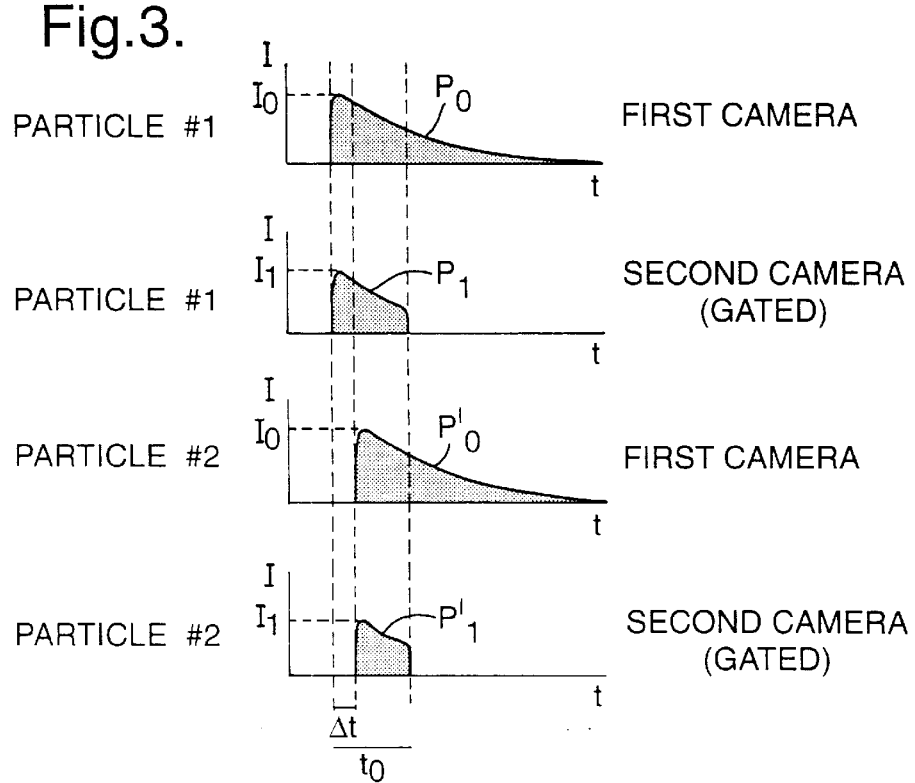
FIG. 3 illustrates characteristic curves illustrating the method of forming a three-dimensional image according to the present invention.

The method for producing a three-dimensional image according to the present invention will now be described in greater detail and with reference to FIGS. 2 and 3. It should, however, be realized that the same essential method can be applied when the device 18 is not utilized and the time dependency of the incoming radiation is known.

Assuming that two particles (photons) 1 and 2 are hitting the surface of the converter 20 with a time difference Δt. After the electron conversion and amplification through the MCP 20, two light spots are visible on the screen 26. If the decay time of the electroluminescent material is given by τ, then the time dependence of the intensity for each particle in both cameras 6 and 8 can be plotted as seen in FIG. 3.

In each pixel of the cameras, the integrated intensities are P$_0$ and P'$_0$ for the first and second particle, respectively, in the non-gated camera 6, and P$_1$ and P'$_1$, respectively in the gated camera 8. The gate time is t$_0$. From a perusal of the Figure it can be seen that from the ratio between P$_1$ and P$_0$, the gating time can be obtained, while the time difference between the two particles is related to the ratio between P'$_1$ and P'$_0$. More specifically, for simplification, assuming an exponential decay time for the light emitted from the electroluminescence material, the following equations are obtained:

$$P_0 = I_0 \int_0^\infty e^{-t/\tau} dt = I_0 \tau \qquad (1)$$

$$P'_0 = I_1 \int_{\Delta t}^\infty e^{-(t-\Delta t/\tau)} dt = I_1 \tau \qquad (2)$$

$$P_1 = I_0 \int_0^{t_0} e^{-t/\tau} dt = I_0 \tau [1 - e^{-t_0/\tau}] \qquad (3)$$

$$P'_1 = I_1 \int_{\Delta t}^{t_0} e^{-(t-\Delta t)/\tau} dt = I_1 \tau [1 - e^{-(t_0-\Delta t)/\tau}] \qquad (4)$$

where I$_0$ and I$_1$ are the peak intensity of the light for the first and second particles respectively.

If Ω is defined as:

$$\Omega = \frac{P_1}{P_0} = 1 - e^{-t_0/\tau} \qquad (5)$$

then the gate time can be extracted from the ratio of the intensities $$t_0 = \tau \ln(1-\Omega) \qquad (6)$$

hence, the ratio between P'$_1$ and P'$_0$ is defined as:

$$\Omega' = \frac{P'_1}{P'_0} = 1 - e^{-(t_0-\Delta t)/\tau} \qquad (7)$$

The time difference Δt between the two events can be deduced from this last equation:

$$\Delta t = \tau \ln\left(\frac{1-\Omega'}{1-\Omega}\right) \qquad (8)$$

A simulation of the decay process of the electroluminescent material and the use of the above equations show that a resolution of about 100 picoseconds is achievable if the intensity ratio for each pixel can be measured within a precision of 5%. If the pixels' intensity is analyzed using, for example, an analog to digital converter (ADC) with 8 bits only, a precision of 0.5% is easily reached.

The device described above can be used with, for example, a flashlight (such as fast U.V. lamps) to get a fast full 3-D picture. A flash lamp could, for example, illuminate a room with a short pulse. The reflected light from all the objects in the room will reach the system 2. Because of the finite speed of light, however, photons coming from objects which are at larger distances will reach the camera later than those coming from shorter distances. Since the proposed device can measure the time of arrival in each pixel of the camera, not only the 2-D picture is taken (with great sensitivity), but also the distance of each point can be calculated. The distance resolution is of the order of a few centimeters and is independent of the distance at which the objects are located. Similarly, the system can measure the speed of fast moving objects in one single picture.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A three-dimensional imaging system, comprising:

a first camera having a first optical axis;

a second camera having a second optical axis parallel to said first optical axis, the first camera and the second camera capturing a common field of view;

a gating device interposed only between said second camera and said common field of view;

a frame grabber connected to said first camera and said second camera; and a computer, that receives signals output from said first camera and said second camera, representing, pixel by pixel, light intensities of an image during a predetermined period of time and signals representing same pixel by pixel of light intensities arriving at said second camera until said gating device is closed, said computer determining three-dimensional imaging signals therefrom to be displayed.

2. The system as claimed in claim 1, wherein said field of view is constituted by incoming or reflected radiation emanating from a pulsed light source.

3. The system as claimed in claim 1, wherein said field of view is constituted by two-dimensional images displayed on an electroluminescent screen.

4. The system as claimed in claim 1, further comprising a radiation converting and amplification unit interposed between said system and said field of view.

5. The system as claimed in claim 4, wherein said unit comprises a first layer facing said field of incoming radiation, constituting a radiation converter, a second layer constituting an electron multiplier and a third layer constituting an electroluminescent screen.

6. The system as claimed in claim 5, further comprising means for accelerating electrons from layer to layer.

7. The system as claimed in claim 1, wherein said gating device is an optical gate.

8. A method for producing three-dimensional imaging, comprising:

receiving signals from a first camera positioned about a first optical axis, the signals from the first camera representing, pixel by pixel, light intensities of an image displayed on an electroluminescent screen having a known decay time;

receiving signals from a second camera positioned about a second optical axis parallel to the first optical axis, the signals from the second camera representing, pixel by pixel, light intensities of the image displayed on the screen, the first camera and the second camera capturing a common field of view of the screen, a gating device being interposed between the second camera and the common field of view;

closing the gating device and noting a gating time; and determining, pixel by pixel, signals representing a three-dimensional image by dividing signals representing light intensities of the first camera, by signals representing light intensities of the second camera until the gating device is closed, in accordance with the known decay time and the gating time.

9. The method as claimed in claim 8, wherein the step of determining a three-dimensional image is carried out by using a decay calibration curve for the specific electroluminescent material of said screen.

10. A method for producing three-dimensional imaging, comprising:

receiving signals from a first camera positioned about a first optical axis, the signals from the first camera representing light intensities of an image formed by one of an incoming radiation and a reflected radiation emanating from a pulsed light source with a known time dependency;

receiving signals from a second camera positioned about a second optical axis parallel to the first optical axis, the signals from the second camera representing light intensities of the image formed by the one of an incoming radiation and a reflecting radiation emanating from the pulsed light source, the first camera and the second camera capturing a common field of view, a gating device being positioned between the second camera and the common field of view;

closing the gating device and noting a gating time; and determining, pixel by pixel, signals representing a three-dimensional image by dividing signals representing light intensities of the first camera, by signals representing light intensities of the second camera, until the gating device is closed, in accordance with the known time dependency and the gating time.

* * * * *